No. 782,485. PATENTED FEB. 14, 1905.
J. CAMPBELL.
MEANS FOR DISTRIBUTING COAL OR OTHER MATERIAL.
APPLICATION FILED MAR. 4, 1903.

4 SHEETS—SHEET 1.

WITNESSES:

INVENTOR:

No. 782,485. PATENTED FEB. 14, 1905.
J. CAMPBELL.
MEANS FOR DISTRIBUTING COAL OR OTHER MATERIAL.
APPLICATION FILED MAR. 4, 1903.

4 SHEETS—SHEET 2.

WITNESSES:

INVENTOR:

No. 782,485. PATENTED FEB. 14, 1905.
J. CAMPBELL.
MEANS FOR DISTRIBUTING COAL OR OTHER MATERIAL.
APPLICATION FILED MAR. 4, 1903.

4 SHEETS—SHEET 3.

WITNESSES:
INVENTOR:

No. 782,485. PATENTED FEB. 14, 1905.
J. CAMPBELL.
MEANS FOR DISTRIBUTING COAL OR OTHER MATERIAL.
APPLICATION FILED MAR. 4, 1903.

4 SHEETS—SHEET 4.

WITNESSES:

INVENTOR:

No. 782,485. Patented February 14, 1905.

UNITED STATES PATENT OFFICE.

JEREMIAH CAMPBELL, OF NEWTON, MASSACHUSETTS.

MEANS FOR DISTRIBUTING COAL OR OTHER MATERIAL.

SPECIFICATION forming part of Letters Patent No. 782,485, dated February 14, 1905.

Application filed March 4, 1903. Serial No. 146,185.

*To all whom it may concern:*

Be it known that I, JEREMIAH CAMPBELL, a citizen of the United States, residing at Newton, in the county of Middlesex and State of Massachusetts, have invented a new and useful Improvement in Means for Distributing Coal or other Material, of which the following is a full, clear, and exact description, reference being had to the accompanying drawings, forming a part of this specification, in explaining its nature.

The invention comprises a hopper adapted to receive coal or other material and to deliver it simultaneously into two distributing-chutes or into one or the other of the chutes, according as it may be desired. To accomplish this purpose, I employ a hopper having outlets, two inclined sides, and in each side near its bottom I arrange an outlet opening into a passage the upper part of which is preferably inclined outward somewhat and the lower part of which is substantially perpendicular. Each outlet is controlled by means of its individual gate, which is independently operated. To the lower end of the member forming each passage there is secured a coupling adapted to rotate thereon and to pivotally support the upper end of a chute. The coupling and chute are adapted to be used simultaneously when both openings of the hopper are opened or successively, as when one outlet only is open. Both are also adapted to be closed off at the same time from the hopper by closing both its outlets. An apparatus of this description is especially desirable for use in bunkering vessels.

I will now describe the invention in connection with the drawings forming a part of this specification, wherein—

Figure 1:
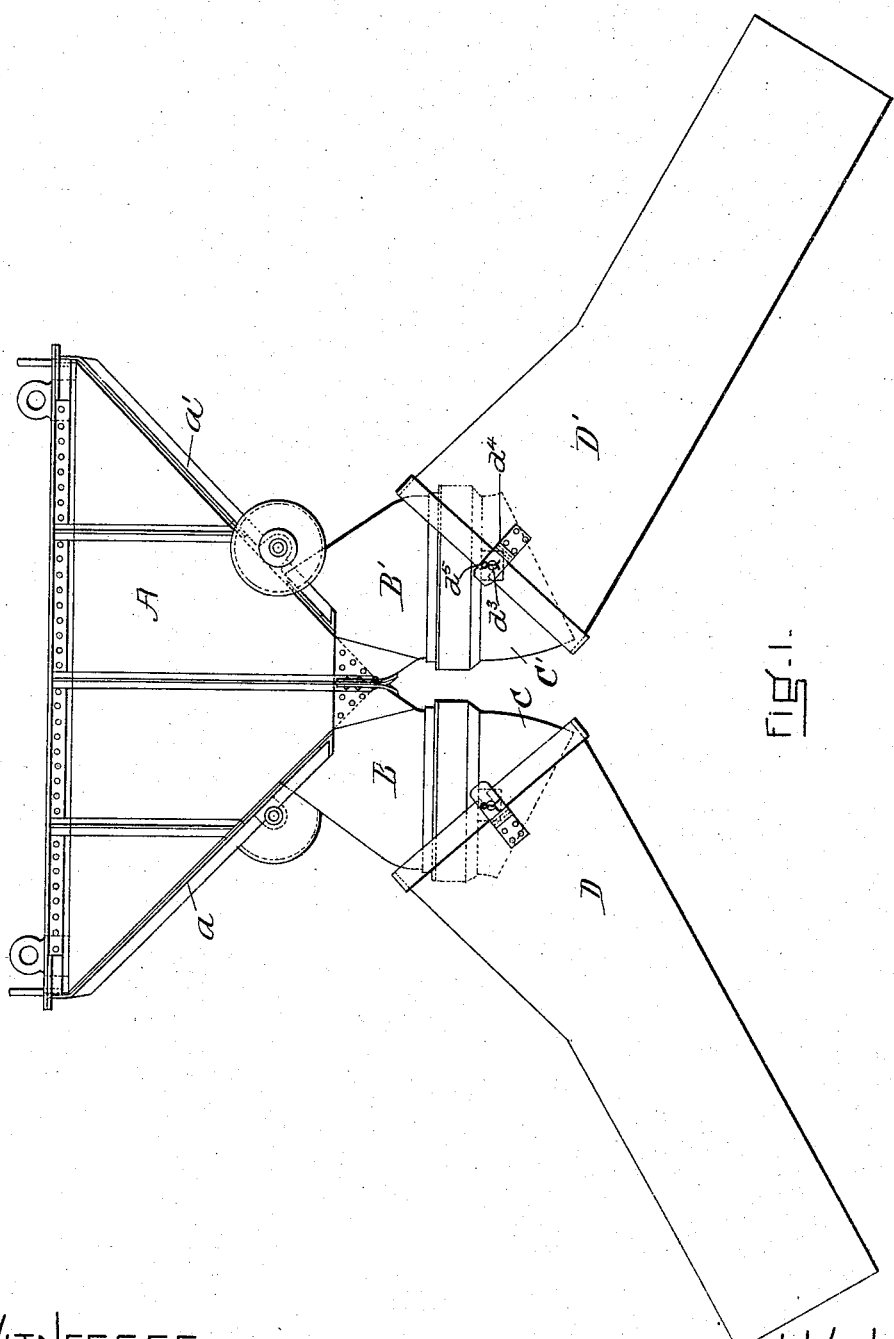
Figure 2:
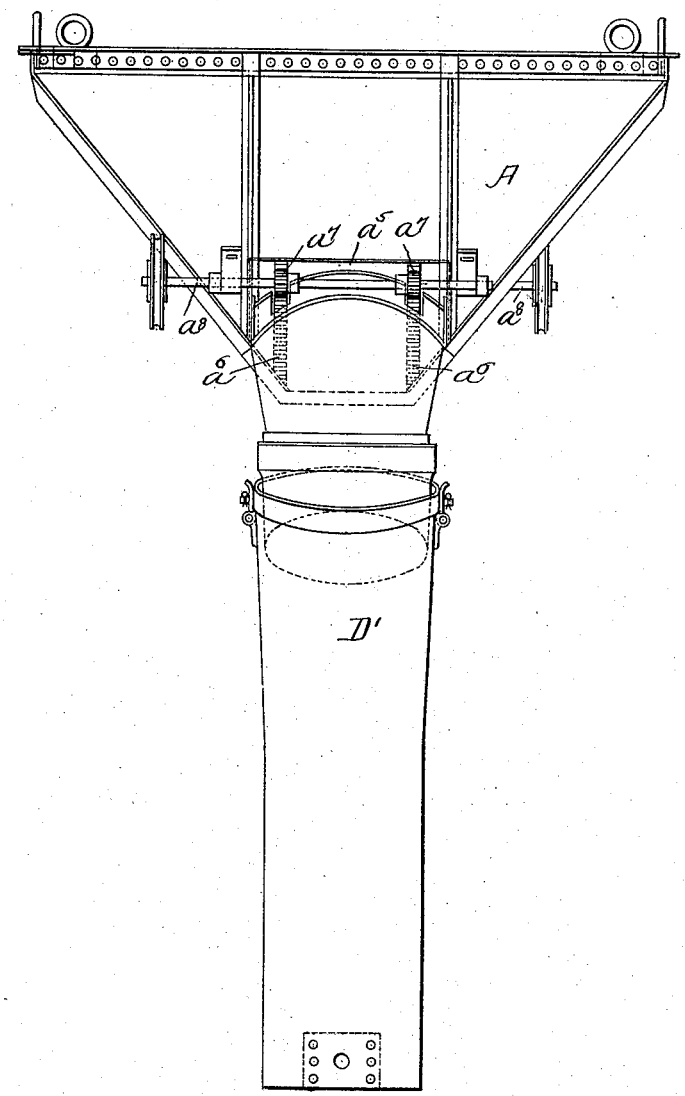
Figure 3:
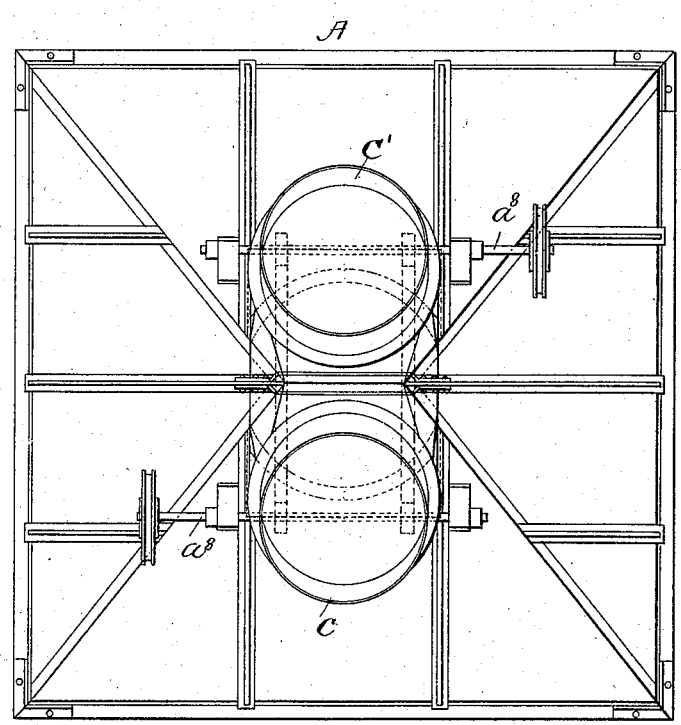
Figure 4:
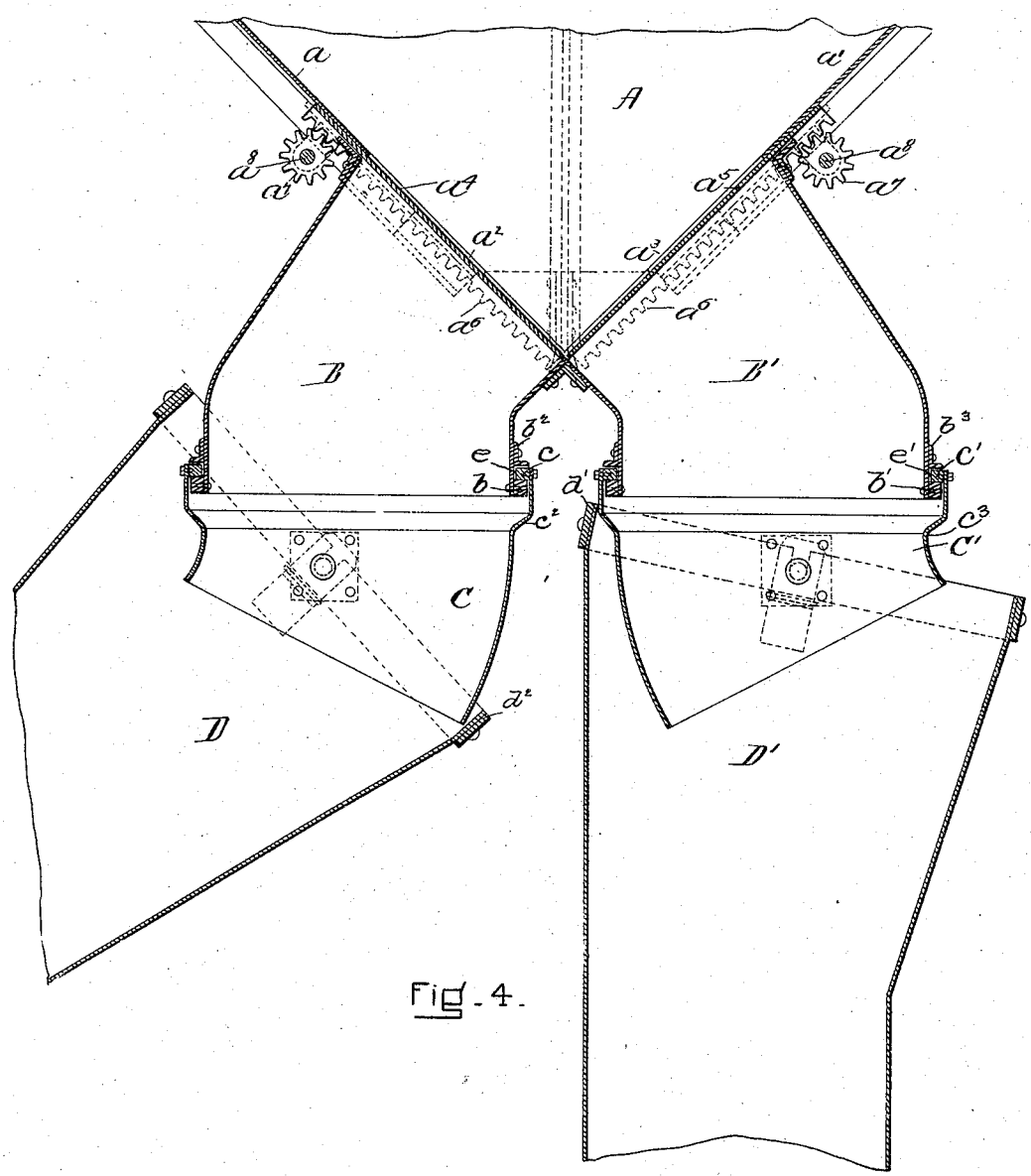

Figure 1 is a view of my invention in end elevation. Fig. 2 is a view thereof in side elevation. Fig. 3 is a view thereof in plan inverted. Fig. 4 is a view, enlarged, principally upon a vertical central section and showing the lower portion of the hopper only.

Referring to the drawings, A represents the hopper, $a\ a'$ its inclined sides oppositely arranged with respect to each other, and $a^2$ is the outlet in the side $a$ and $a^3$ the outlet in the side $a'$. These outlets extend upward and outward from the bottom of the hopper, and each is closed by a gate, the outlet $a^2$ by the gate $a^4$ and the outlet $a^3$ by the gate $a^5$. I have represented these gates as arranged to slide in ways on the outer surface of the sides and to be operated by means of racks $a^6$ on each gate and pinions $a^7$ on the shafts $a^8$, attached to the hopper, one adjacent to each outlet. These shafts are adapted to be individually turned by a rope and wheel or in any other desired way. Each gate is thus independently operated to open and close the outlet with which it is used, and thus both outlets may be opened at the same time or either one or both may be closed. The gate $a^4$ controls the outlet $a^2$ to the passage B, and the gate $a^5$ controls the outlet $a^3$ to the passage B'. These passages are composed of stationary tubular members which are bolted to the inclined sides $a\ a'$ of the hopper, and the passages are at first inclined and then perpendicular.

In order to give flexibility to the apparatus and make it possible to deliver coal in any direction or place, stationary tubular members B and B' are provided, with short tubular couplings C and C' arranged to swivel on the members B and B', which are in turn provided with the swinging chutes D and D'. In order to accomplish this swivel movement, the couplings C C' are provided with collars $c$ and $c'$ on the interior of their upper flared ends $c^2$ $c^3$. These said collars $c$ and $c'$ are adapted to revolve in the annular guide-space $e\ e'$, formed between the collars $b\ b'$ and the circular angle-irons $b^2\ b^3$, fastened to the stationary members B and B'. The chutes D and D$^4$ are enlarged upon one side at their upper ends, where they have rings to reinforce the upper ends. They are attached to the couplings C C' by means of the studs $d^3$, which extend outward from the coupling into recesses in the upper ends of the chutes and into holes in the latches hinged to the upper end of the chutes upon their outer sides and adapted to be closed over the projecting ends of the studs. These studs are threaded at their outer ends and adapted to carry split pins $d^5$ for holding the latches upon them. This connects the chute with the coupling by a pivotal connection, which permits the chute to be swung upon the coupling to vary the position of the outlet. By making the coupling curved and longer upon one side, as is shown in Fig. 4, it becomes possible to provide the chute with a relatively long range of movement with respect to a short coupling without opening a joint between them.

While I have shown my invention as applied to a hopper adapted to deliver to two chutes, I do not confine myself to its use with two chutes, as a third or more might be used without making any material change in the construction.

By the devices specified the hopper may be employed for delivering coal simultaneously to two bunkers or places of reception or with each bunker successively or with only one bunker or may be entirely cut off from both.

Having thus fully described my invention, I claim and desire to secure by Letters Patent of the United States—

1. A device for distributing coal or other material, comprising a stationary tubular member, a curved swivel tubular coupling adapted to revolve on said stationary tubular member, and a chute, said chute having a circular cross-section at one end and being pivoted to said coupling so as to swing on a diameter of said cross-section whereby the coal or other material may be distributed to a large area without leakage.

2. In a device for distributing coal or other material comprising a hopper, one or more stationary tubular members attached to said hopper in combination with a like number of curved swivel tubular couplings and chutes, said chutes having a circular cross-section at one end and being pivoted to said coupling, whereby they may swing on a diameter of said cross-section, as and for the purposes set forth.

3. In a device for distributing coal or other material, in combination, a stationary tubular member, a curved tubular coupling, and a chute, one end of said chute having a circular cross-section and being adapted to swing on a diameter of said cross-section, whereby coal or other material may be distributed over a large area without leakage or clogging, as described.

4. In a device for distributing coal or other material, in combination, a stationary tubular member, a curved tubular coupling, and a chute pivotally attached to said coupling, said chute having a circular cross-section at one end and being pivoted to said coupling on a diameter of said cross-section, said coupling having the center of curvature of the convex portion substantially on the axis of the pivot, as shown.

5. In a device for distributing coal or other material, in combination, a stationary tubular member, a curved tubular coupling, said coupling being cut off on a radius of curvature of the curved portion, and a chute, one end of said chute having a circular cross-section and being adapted to swing on a diameter of said cross-section, whereby coal or other material may be distributed over a large area without leakage or clogging, as described.

JEREMIAH CAMPBELL. [L. S.]

In presence of—
 W. P. GARDNER,
 H. WATSON.